United States Patent
Heinrichs et al.

(10) Patent No.: US 7,383,284 B2
(45) Date of Patent: Jun. 3, 2008

(54) INVENTORY MANAGEMENT

(75) Inventors: Matthias Heinrichs, Speyer (DE);
Pascale Van Laethem, Ketsch (DE);
Markus Seng, Berlin (DE); Achim Heger, Berlin (DE)

(73) Assignee: SAP Aktiengesellschaft, Walldorf (DE)

( * ) Notice: Subject to any disclaimer, the term of this patent is extended or adjusted under 35 U.S.C. 154(b) by 528 days.

(21) Appl. No.: 10/159,599

(22) Filed: May 31, 2002

(65) Prior Publication Data

US 2003/0204480 A1 Oct. 30, 2003

Related U.S. Application Data

(63) Continuation-in-part of application No. 10/136,847, filed on Apr. 30, 2002, now abandoned.

(51) Int. Cl.
*G06F 7/06* (2006.01)

(52) U.S. Cl. ............................... 707/104.1; 707/103 Y

(58) Field of Classification Search .................. 705/28; 707/104.1, 102, 103 Y
See application file for complete search history.

(56) References Cited

U.S. PATENT DOCUMENTS

| | | | |
|---|---|---|---|
| 4,563,739 A * | 1/1986 | Gerpheide et al. ............ | 705/28 |
| 5,548,749 A * | 8/1996 | Kroenke et al. ............ | 707/102 |
| 5,712,989 A * | 1/1998 | Johnson et al. ................ | 705/28 |
| 6,493,724 B1 * | 12/2002 | Cusack et al. ............ | 707/104.1 |
| 2002/0042835 A1 * | 4/2002 | Pepin et al. ................. | 709/232 |

OTHER PUBLICATIONS

R. Lawrence and K. Barker. Automatic integration of relational database schemas, Jul. 2000, ☐☐ Technical Report TR-00-15, Department of Computer Science, University of Manitoba, pp. 1-16.*

* cited by examiner

*Primary Examiner*—Paul L Rodriguez
*Assistant Examiner*—Luke Osborne
(74) *Attorney, Agent, or Firm*—Blakely, Sokoloff, Taylor & Zafman, LLP

(57) ABSTRACT

Methods and apparatus, including computer program products, implementing and using techniques for inventory management. Managing data items in an inventory management system. A request to add a data item to the inventory management system is received. The data item has an associated set of attributes to be represented in the inventory management system. It is determined whether the inventory management system includes a structure in which the data item and the sets of attributes associated with the data item can be represented. If no structure exists in which the data item and the set of attributes associated with the data item can be represented, a new structure is automatically defined in which the data item and the set of attributes associated with the data item can be represented. The data item and the set of attributes associated with the data item is added to the defined new structure.

18 Claims, 9 Drawing Sheets

INVENTORY MANAGEMENT

RELATED APPLICATIONS

This application is a continuation-in-part of, and claims priority from, U.S. patent application Ser. No. 10/136,847 filed on Apr. 30, 2002, (Abandoned) having common inventors Matthias Heinrichs, Pascale Van Laetham, Markus Seng, and Achim Heger, common ownership, and titled Inventory Management, the contents of which are incorporated herein by reference.

BACKGROUND

This invention relates to inventory management.

A typical supply chain management (SCM) system involves the management of materials, information, and finances as they move in a process from a supplier to a manufacturer, a wholesaler, a retailer, and to the final consumer. A SCM system can be viewed as a process that includes a product flow, an information flow, and a finance flow. The product flow includes the movement of goods from a supplier to a customer, as well as any customer returns or service needs. The information flows involves transmitting orders and updating the status of the delivery. The finance flow includes credit terms, payment schedules, and consignment and title ownership arrangements. All these different types of flows can be controlled and monitored using computer software.

Typically, SCM software can be divided into two application categories: planning applications and execution applications. Planning applications use advanced algorithms to determine the best means to fill an order. Execution applications track the physical status of goods, the management of materials, and financial information involving the various parties in the supply chain.

One example of a software solution for supply chain management is the mySAP Supply Chain Management (mySAP SCM™) solution provided by SAP AG, located in Walldorf, Germany. The mySAP SCM™ solution is integrated with the mySAP.com® e-business platform that also provides other solutions, such as mySAP Product Lifecycle Management that ties suppliers into the design process and thereby increases quality and reduces time to market; mySAP Supplier Relationship Management that is used to locate the best suppliers and shorten sourcing cycles; and mySAP Customer Relationship Management that provides visibility into the end customer (see the worldwide website of SAP.com® for further information about the mySAP.com® e-business platform).

One important function of SCM systems is to manage stock, for example, keeping stock quantities, recording stock quantity changes resulting from goods movements, and providing information in response to queries about stock quantities and stock movements. In the current mySAP.com e-business solution, most of the functionality relating to Enterprise Resource Planning (ERP), including stock management, is performed by an SAP R/3 software component.

The changing nature of supply chains cause new needs that can not or can only partly be fulfilled by existing solutions, such as the SAP R/3 component. For example, the flow of goods in a global supply chain often includes the participation of several partners working with different SCM systems. It would be desirable to be able to retrieve stock information throughout the whole supply chain. Another example of new needs relate to logistic service providers, who need to manage physical inventories from different companies in a single warehouse. In existing applications, the underlying structure for stock management functionality is typically linked to the structure of the company owning the stock and can not handle an organization that only temporarily manages the stock (such as a logistics service provider).

There is also an increased need for management of stock quantity data substantially in real time. Some types of stock need to be represented in multiple units, because certain properties may change (for example, gasoline increases its volume when the temperature increases, while the mass is constant, and therefore a volume representation only is insufficient). Companies also need the flexibility to add new products, product groups, and so on to their stock management applications.

SUMMARY

In general, in one aspect, this invention provides methods and apparatus, including computer program products, implementing and using techniques for managing data items in an inventory management system. A request to add a data item to the inventory management system is received. The data item has an associated set of attributes to be represented in the inventory management system. It is determined whether the inventory management system includes a structure in which the data item and the set of attributes associated with the data item can be represented. If no structure exists in which the data item and the set of attributes associated with the data item can be represented, a new structure is automatically defined in which the data item and the set of attributes associated with the data item can be represented. The data item and the set of attributes associated with the data item is added to the defined new structure.

Advantageous implementations can include one or more of the following features. The data item can represents a stock item, a handling unit, or a location. The inventory management system can include a hierarchy representing relations between a plurality of data items. Each data item can be represented by a unique identifier in the hierarchy, and unique identifier can be automatically defined for the added data item and the associated set of attributes, a location within the hierarchy can be determined for the added data item, based on one or more of the attributes in the set of attributes associated with the added data item, and the unique identifier can be added to the hierarchy at the determined location. The determining and adding steps are performed in accordance with a set of rules associated with the hierarchy.

Receiving a request to add a data item can include receiving an XML document defining the data item and the associated set of attributes. One or more external systems can be updated in response to the adding of the data item and the set of attributes associated with the data item to the defined new structure. The structure can be one or more of an index table, a stock table, a serial number table, and a tree hierarchy table. The data item can be represented in a unique index table that includes a global unique identifier field and one or more attribute fields, each attribute field representing an attribute associated with the data item. The tree hierarchy table can be updated every time a unique identifier is created. The index table can be a stock index table, a location index table, or a handling unit index table.

The invention can be implemented to realize one or more of the following advantages. The Lean Inventory Management Engine (LIME) can keep near real time information about which quantities of a physical inventory is stored on which handling unit and at which location. Inventory management functions can be supported along the whole supply chain, from procurement and delivery to consumption, production and sales, shipping, transportation and value-added services (for example, labeling and packing). The inventory management functions include keeping stock quantities, recording the stock quantity changes resulting from goods movements, and answering queries about stock quantities and stock movements.

Stock information can be retrieved throughout the whole supply chain because stock quantities are visible from various locations in the supply chain (for example, in an external warehouse or on a truck). This is particularly useful for vendor-managed inventories (VMI), where a vendor is responsible for the replenishment of the stock of his customers.

LIME provides the necessary functionality for customers to handle, monitor and manage inventories in several units of quantity simultaneously, where the conversion factors may not be constant. In special cases, such as the oil industry, there are industry and process specific ways of converting the quantities.

In LIME stock quantity data is organized using object-oriented techniques, which allows the physical inventory to be represented in a hierarchical inventory structure, that is, a tree-like structure of nodes representing locations, handling units, or stock units. The location nodes contain handling unit nodes, which in turn contain stock unit nodes. When any node in the hierarchy is moved, nodes below the current node are moved automatically, which is useful in a wide range of situations. For example, a logistics service provider can move a container without having knowledge of the actual contents of the container. Stock quantities of a location can easily be moved to another location. A warehouse can easily be outsourced, so that all content of the warehouse changes the operator. Bulk transportation in tanks and compartments can be made possible, even when the contents of the tanks and compartments are owned by several legal entities.

Logistic service providers can manage physical inventories from different companies in the same warehouse, which is not possible with existing storage management applications since the inventory management typically is related to the structure of a company. With LIME, a logistics service provider (such as an external warehouse) can manage the same material number for different stock units from different companies in the same location. Changes in company structures (such as merging and outsourcing) are easy to handle, since a stock operator and a stockowner can be treated separately.

LIME allows for Logistics systems and Finance systems to be separated, which is a benefit because finance applications typically deal with periodic information and can accept a certain delay in their data update, while logistics applications need exact quantities at all time and require updates within seconds or fractions of a second (zero latency). Such a separation is typically not possible in existing inventory management engines, because valuation data is deeply embedded in the applications. When financial data (documents and accounts), controlling data, material-ledger data, and so on, are updated for every update of stock quantity data during a goods movement, a performance degradation of the quantity update will result due to the many updates that are necessary. LIME avoids this problem by dealing with quantities only. The value updates as well as the updates in most subsequent applications can take place periodically in an aggregated form at a later time. Furthermore, stock quantities themselves are kept in one place in LIME, instead of in various components, which often is the case with conventional systems. Therefore, redundant quantity updates during a goods movement can be avoided, as well as complex consistency and repair reports that are needed to ensure that all components are matching.

LIME is based on a flexible data architecture. For example, LIME can operate in a standalone manner as a sub-component for applications that manage stock quantities, can be integrated with SAP R/3 systems, has clearly defined interfaces so as to cooperate with components such as finance, business information warehouse, classical materials management inventory management (MM-IM) systems as well as with external systems such as warehouse management (WM) systems.

The details of one or more implementations of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

The inventory management engine, also referred to as Lean Inventory Management Engine (LIME), works as a service and can be used as a stand-alone component or an add-on component in an existing SCM system. The inventory management engine does not contain any user interfaces. Therefore, all dialog functions related to the physical stock quantities and stock movements are contained in separate, external components, as will be described below. The primary purpose of the inventory management engine is to keep and move the physical stock and answer queries from other applications about stock quantities and stock movements.

Figure 1A:
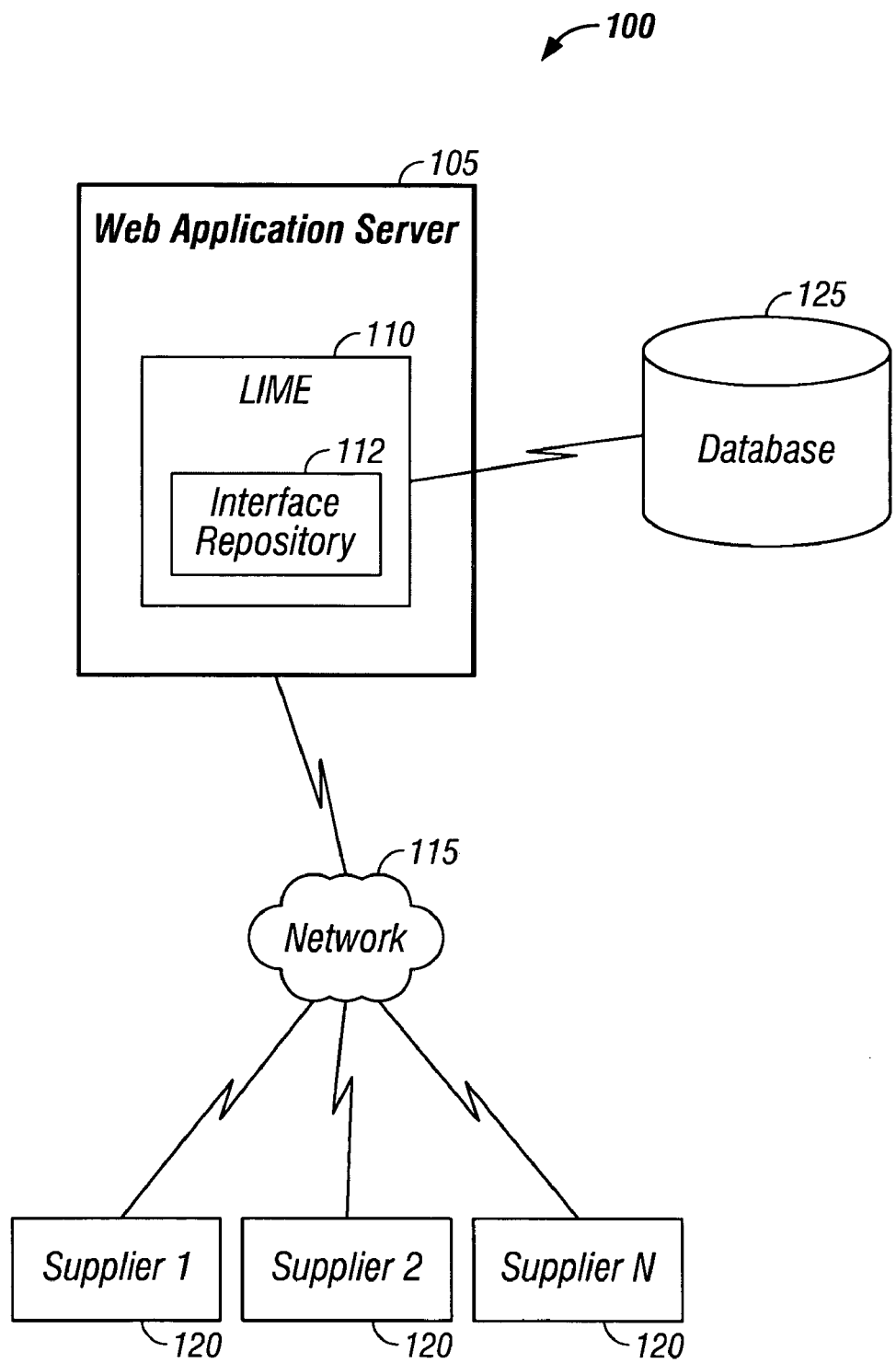
FIGS. 1A-C show simplified block diagrams of various implementations of an inventory management system.

FIG. 1A is a simplified block diagram of one implementation of an inventory management system (100), for example, for a company having one inventory to manage. The company can be a manufacturer that receives supplies from n suppliers and operates the inventory management system (100) in a manner that permits the suppliers to input data regarding the particular stock items they supply to the manufacturer. For example, the manufacturer can have an agreement with the suppliers that all finished products in the suppliers' warehouses that will be available to the manufacturer are to be input into the inventory management system (100) such that the manufacturer will be able to anticipate shortages of supplies. Individual suppliers can also be authorized to view data in the inventory management system (100) that pertains to levels of the particular stock item the individual suppliers supply. For example, the suppliers may have an arrangement with the manufacturer to maintain an inventory range of a particular part at the manufacturer's facility. Thus, viewing the inventory data will enable the suppliers to supply stock items as necessary to ensure that the number of stock items at the manufacturer's facility is within the specified range. The suppliers also will be able to determine whether they must increase or reduce their production.

The management system (100) includes a web application server (105) that runs an inventory management engine (110) and that communicates over a network (115) with the suppliers (120). The web application server (105) communicates with a database (125) that includes inventory related data. The company operating the web application server (105) can be, for example, a manufacturer of simple and/or complex items. A manufacturer of a complex item may receive supplies from many suppliers, whereas the manufacturer of a simple item may receive supplies from much fewer suppliers. Nevertheless, in either situation the inventory management system operates scalably to handle the transactions required of the system (100). One example of an inventory management engine (110) is SAP's LIME.

An example of a network (115) includes a wired network, such as the Internet, or a wireless network. The inventory management engine (110) includes a set of interface layers (112) so that the inventory management engine (110) can communicate with a large variety of external systems.

Figure 1B:
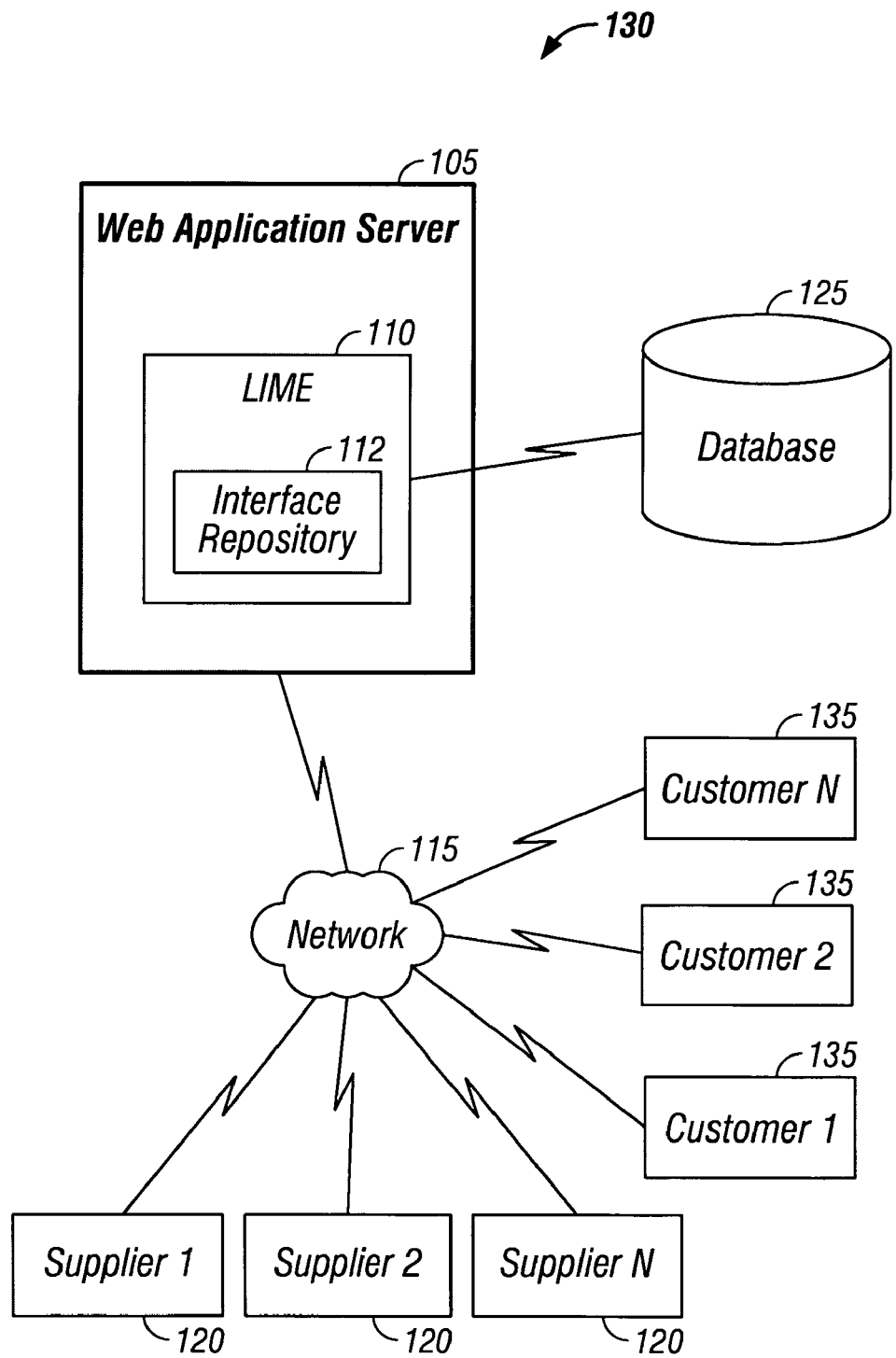

FIG. 1B is a simplified block diagram of an implementation of a second inventory management system (130) to, for example, a company that receives stock items from n suppliers (120) and also manufactures and supplies stock items to n customers (135). For example, the customers (135) may be manufacturers of other items. In this implementation, the inventory management system must be able to store the data and handle the queries and transactions of both the suppliers and the customers. The company operating the web application server (105) and inventory management engine (110) of FIG. 1B may be, for example, one of the suppliers of FIG. 1A. As may be evident from FIGS. 1A and 1B, each supplier, manufacturer, and customer in a supply chain may have the need to operate an inventory management system (100, 130). Moreover, there maybe sharing of some of the data stored in the individual databases (125) between multiple inventory management engines (110) such that the members of the supply chain have as much information as possible to ensure that their inventory management is optimized.

Figure 1C:
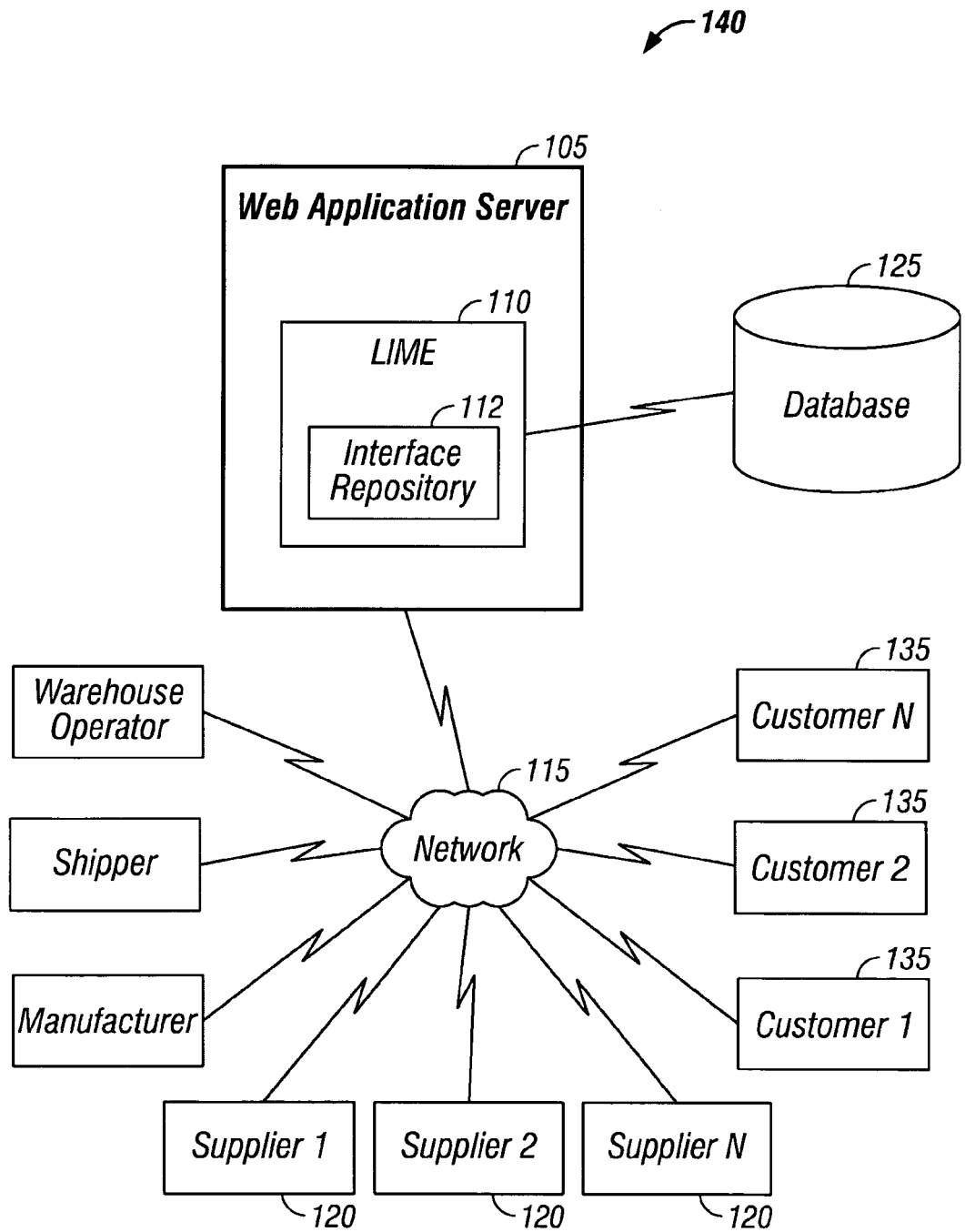

FIG. 1C is a simplified block diagram of an implementation of a third inventory management system (140). The inventory management system (140) includes a company that acts as a service broker of the web application server (105) and the inventory management engine (110) for entities, such as suppliers (120), customers (135), manufacturers (145), warehouse operators (150), and shippers (155). In this implementation, the inventory management system stores the data and handles the queries and transactions of all of the entities that are provided this service by the service broker. Each entity accessing the inventory management engine would be provided an authorization code to access only certain data and only the supply chains in which that entity is involved. In this implementation, the entities advantageously avoid the initial capital costs of setting up an inventory management system as well as the ongoing costs of maintaining the software and hardware associated with such a system. However, the entities are required to pay fees to the service broker for the use of the inventory management system (140).

As was described above, the LIME engine can communicate with a variety of external systems, such as a SAP R/3 system, a non-SAP system (for example, a legacy system in a conventional inventory system), and a valuation system (150). The valuation system can be an accounting or finance system that performs functions related to the valuation of the stock quantity data, such as reporting or analyzing the value of the stock stored in one or more locations. The SAP system can be based on an SAP R/3 computing environment that includes a classical inventory management system (MM-IM), a warehouse management system (LE-WM), and a handling unit (HU) management system, or other computer systems. The external systems can be client computers, such as desktops or laptop personal computers (PCs), having the necessary software for communicating with the web application server over the network. Depending on what type of external system is used, different interfaces are selected from the interface repository (112). Some external systems can use XML (eXtensive Markup Language) via application integration to communicate with LIME. Other applications, such as the SAP system, can use XML via application integration, a CIF (Common Interchange Format) interface, function modules, BAPI (Business Application Programming Interface) and BAdIs (Business Add-Inns). In some cases, the inventory management engine may also communicate with other function modules or engines in the same system through function modules and ABAP (Advanced Business Application Programming) OO (Object Oriented) methods.

The inventory management engine provides the stock quantity data in response to transaction requests from the external systems. For example, a valuation system may send a transaction request requesting to monitor specific stock quantity data so that the valuation system can further process the data such as analyzing the data and producing a report based on the analyzed data. In the retail industry, such a process may include producing a report of the quantity and value of the merchandise in one or more locations.

An exemplary implementation of the inventory management engine will now be described in further detail, in particular with regards to table structures, rules, and how to add or delete entries from a table.

Data Table Structures

An inventory management engine in accordance with one implementation of the invention will now be described by way of example.

Figure 2:
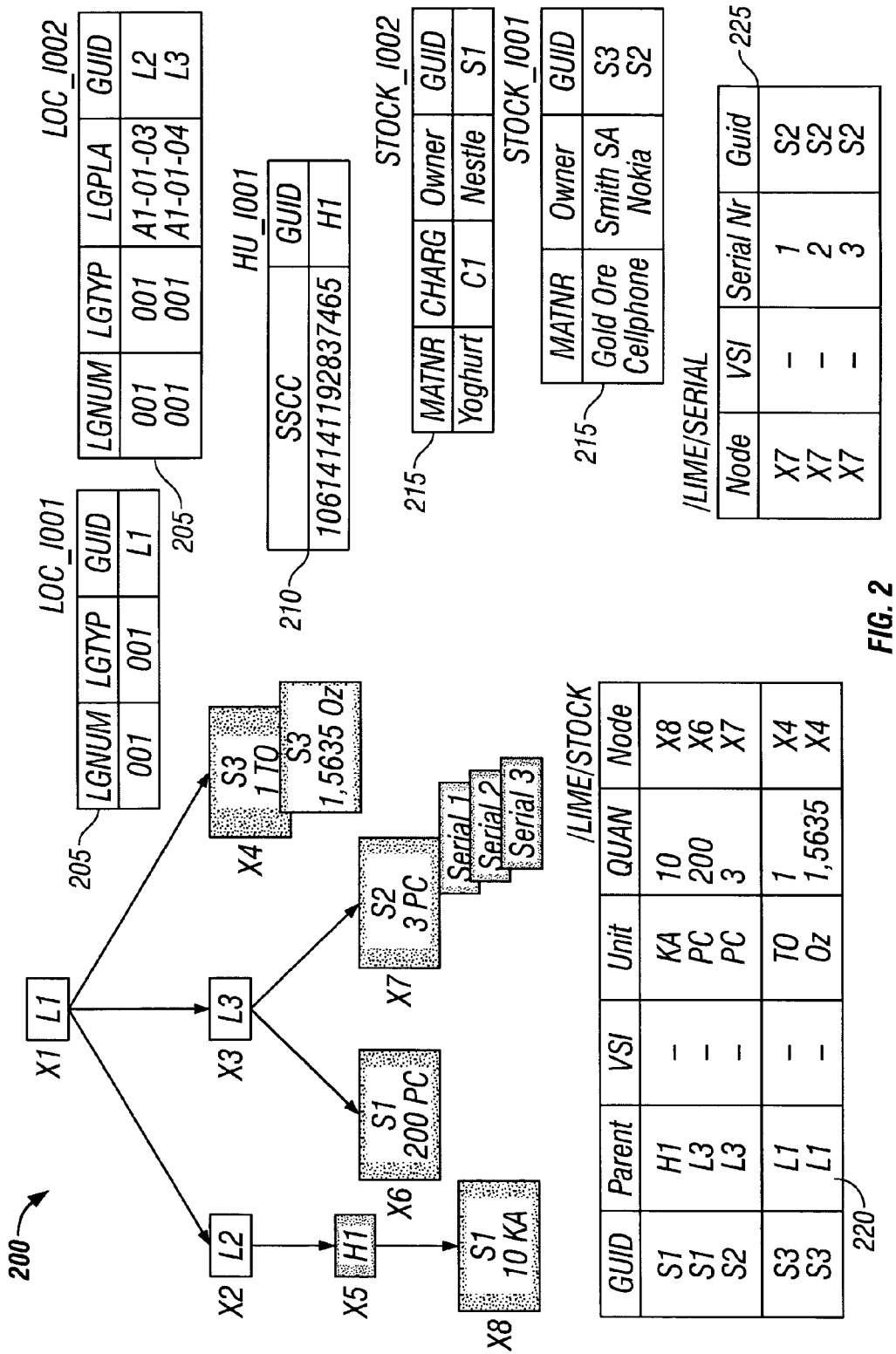
FIG. 2 is a schematic diagram of a table structure in one inventory management engine.

As can be seen in FIG. 2, the database model of a LIME kernel includes a hierarchical tree (200) that contains a set of guids (Global Unique IDentifiers) representing locations (L1 through L3), one or more handling units (H1), stock units (S1 through S3) and serial numbers (Serial1 through Serial 3). A location identifies the physical location of a stock unit and can, for example, be a warehouse, a warehouse gate, a delivery point, a shelf, a storage bin, and so on. A handling unit is an aggregation of stock quantities bundled together for distribution and logistics purposes. Examples of handling units include an individual item in a carton, combined items on pallets and skids, or items transferred in independently identified containers, such as ocean containers, rail cars or trucking trailers. A handling unit usually has a worldwide unique identifier SSCC (Serial Shipping Container Code). The quantity for a handling unit is always one. A stock unit is the smallest entity or item that can be handled and can be physically identified in a logistics process. A stock unit cannot be divided into components for logistic purposes. Single instances of a stock unit are not distinguished, but own the identical attributes and identifier. The stock unit is the carrier of the stock quantity. Examples of stock units include: material, trade item, SKU (T-shirt size L, style country, color green), batch (different production lots for paints, dyes, wallpapers, pharmaceutical products), quantity with a certain shelf-life expiration, serial number, split valuation new/used, manufacturer part number (separate stock units for different manufacturers), value only article is a stock unit using the currency unit as quantity unit, and soon.

Every node in the hierarchical tree (200) has a unique identifier marked with "X" and a number. The hierarchical tree (200) is represented as a table identified by "/LIME/TREE" (not shown) in the inventory management engine's database. The "/LIME/TREE" table is one of the main components of the inventory management engine, and will be discussed in further detail below. First, however, the other tables in the inventory management engine will be described. These other tables include index tables (205-215), a stock table (220) identified by "/LIME/STOCK," and a serial number table (225) identified by "/LIME/SERIAL."

There are three types of index tables in the inventory management engine; index tables for location (205), index tables for handling units (210), and index tables for stock units (215). The index tables (205-215) are used to map real world numbers (that is, business keys) to guids that are to be used in the /LIME/TREE, /LIME/STOCK, and /LIME/SERIAL tables. As can be seen in FIG. 2, there are two index tables for locations (205), which are marked LOC_I001 and LOC_I002. It should be noted that none of the tables in FIG. 2 are complete, but are only used to illustrate the principle of the LIME database model. The location index table LOC_I001 has a first column LGNUM representing a warehouse number and a second column LGTYP representing a storage type. The location index table LOC_I002 additionally contains a third column LGPLA representing a bin location. As can be seen from the tables LOC_I001 and LOC_I002, there is a unique guid L1 for the warehouse number and storage type, and unique guids L2 and L3 for each of the bin locations. Similarly the handling unit index table (210) identified by HU_I001 represents the SSCC with a unique guid H1. The upper one of the stock unit index tables (215) identified by STOCK_I002 has a guid S1 representing the material yogurt, batch C1, produced by Nestle. The lower one of the stock unit index tables (215) identified by STOCK_I001 in which guid S3 represents a gold ore owned by Smith, and a guid S2 represents a cellular telephone owned by Nokia.

All of the guids presented above are of a type referred to as index guids. Index guids refer to the index tables for location, handling unit, or stock item. Another type of guids that is used in the inventory management engine is of a type referred to as node guids. Node guids are used to identify nodes in the hierarchy tree (200). If the same stock item (for example, S1 for material yogurt batch C1) has stock quantities at two different places (for example, handling unit H1 and location L3), each stock quantity S1 will have a different node guid (X8 and X6). A stock quantity can be found in the table /LIME/STOCK (220) with the node guid as a unique key. A serial number is linked to a stock quantity via the node guid and stored in the table /LIME/SERIAL (225). A stock quantity in several units (MTQ) has the same node guid (see for example node X4).

The table /LIME/STOCK (220) is the only table containing stock quantities. A stock quantity refers to a specific node in the hierarchy tree (200). The exemplary /LIME/STOCK table (200) in FIG. 2 contains an index guid column with the guids obtained from the stock index tables (215), a parent column that identifies the parent node of the stock item, a VSI (Virtual Stock Indicator) column that indicates whether the stock item relates to a physical or virtual stock item, a unit column that indicates the unit of measure for the stock item, a quantity column that indicates the quantity of the stock item, and a node column that is a unique key for a stock quantity. The unit of measure is a key field, which allows stock items represented in multiple unit quantities to have different entries in the /LIME/STOCK table (220).

The individual serial numbers are stored in a table (225)/LIME/SERIAL and can be linked to any type of stock item through the node guids without having to add the serial number field to the corresponding index table. The number of serial number entries is linked to the stock quantity in a specific unit of measure, for example, three serial numbers are linked to the node X7 which has a quantity of 3 in the stock index table (220) in FIG. 2. In an alternative implementation, serial numbers can be stored as stock quantity entries in table (220), but that might lead to a very large number of entries in the stock index table (220) and might be performance-critical for queries.

Table 1 below shows an exemplary hierarchy table /LIME/TREE corresponding to the hierarchy tree (200) shown in FIG. 2.

TABLE 1

| Guid | Idx | Type | Parent | Parent Idx | Parent Type | Parent Level | Node |
|------|-----|------|--------|------------|-------------|--------------|------|
| S3 | 001 | S | L1 | 001 | L | 1 | X4 |
| S3 | 001 | S | ROOT | — | | 2 | X4 |
| S2 | 001 | S | L3 | 002 | L | 1 | X7 |
| S2 | 001 | S | L1 | 001 | L | 2 | X7 |
| S2 | 001 | S | ROOT | — | | 3 | X7 |
| S1 | 002 | S | L3 | 002 | L | 1 | X6 |
| S1 | 002 | S | L1 | 001 | L | 2 | X6 |
| S1 | 002 | S | ROOT | — | | 3 | X6 |
| S1 | 002 | S | H1 | 001 | H | 1 | X8 |
| S1 | 002 | S | L2 | 002 | L | 2 | X8 |
| S1 | 002 | S | L1 | 001 | L | 3 | X8 |
| S1 | 002 | S | ROOT | — | | 4 | X8 |
| H1 | 001 | H | L2 | 002 | L | 1 | X5 |
| H1 | 001 | H | L1 | 001 | L | 2 | X5 |
| H1 | 001 | H | ROOT | — | | 3 | X5 |
| L3 | 002 | L | L1 | 001 | L | 1 | X3 |
| L3 | 002 | L | ROOT | — | L | 2 | X3 |
| L2 | 002 | L | L1 | 001 | L | 1 | X2 |
| L2 | 002 | L | ROOT | — | | 2 | X2 |
| L1 | 001 | L | ROOT | — | | 1 | X1 |

Table 1 above contains the relationship between a hierarchy node and its parents as well as all ancestors (grandparents and higher). A node at the highest hierarchy level has a default parent ROOT. The node guid is the exact identifier of a node and can be used to retrieve the complete path from a node to all the ancestors of the node. The column headings Idx and Type above refer to index table number and index table type, respectively. In this exemplary implementation of the LIME engine, the structure and the entries of the /LIME/TREE table have two primary goals. First, writing to the /LIME/TREE table should be fast. Therefore, there is only a small number of fields and all entries (relationship node to parent and node to ancestors) can be inserted in a single database statement. Second, queries, in particular bottom-up queries, such as "Where can I find a stock quantity (node) within a location (ancestor)?" need to be efficient. This is particularly important for warehouse management applications, where it should be possible to obtain information with a minimum of DB accesses. With the above table it is possible, for example, to read the stock quantity node guids directly of any location (ancestor) in the hierarchy tree, read the stock quantity of any node in table /LIME/STOCK (220) via the node guid, and read the intermediate nodes (e.g. HU, sub-location) in /LIME/TREE via the node guid if the hierarchy information is requested by the query.

Furthermore, no additional entries are requested for MTQ (Multiple Transaction Quantities) of the same stock item. All quantities have the same guids (stock index guid, parent index guid, node guid) because they represent the same physical stock. The MTQ quantities are kept in table /LIME/STOCK (220) only (where the unit of measure is a key field).

Table Rules

The table structures described above allow the users to build virtually any kind of hierarchy, but the logical consistency needs to be checked against two kinds of rules, namely hierarchy rules (for example, a stock guid cannot have any children; a HU cannot be parent to a location, the highest node should always be a location, and so on) and business logic rules (for example, a bin location cannot be parent to a plant/storage location, and so on). A user can define specific business rules in customizing/system tables.

In one implementation of the inventory management engine, the hierarchy rules are as follows:

1. Stock quantities can only be found at stock item level. There can be no stock quantities at the handling unit, location, or serial number levels.

2. A serial number is always linked to a stock item. The serial number cannot be linked directly to a handling unit or to a location.

3. A multi-level hierarchy of locations (nested locations) and handling units (nested handling units) is possible.

4. A multi-level hierarchy of stock items (containing the stock quantities) is not allowed (no nested stock items).

5. A stock item must have either a handling unit or a location as parent.

6. A stock item can be appended to each node of the hierarchy. It is thus possible to represent a location containing materials on handling units and materials without handling units.

7. A location can exist without a handling unit or without a stock item (empty location).

8. A handling unit can exist without a stock item (empty handling unit).

9. A stock item or a handling unit cannot exist without a location.

10. A location can only have another location as parent (no handling unit or stock item).

11. A node in the hierarchy tree can only have one parent.

12. A specific location or a specific handling unit can only exist once in the hierarchy tree. Consequently, it is not possible to have a recursive hierarchy.

A user may define additional hierarchical rules and business rules to further constrain the functionality of the inventory management engine to specific situations, if necessary.

Figure 3:
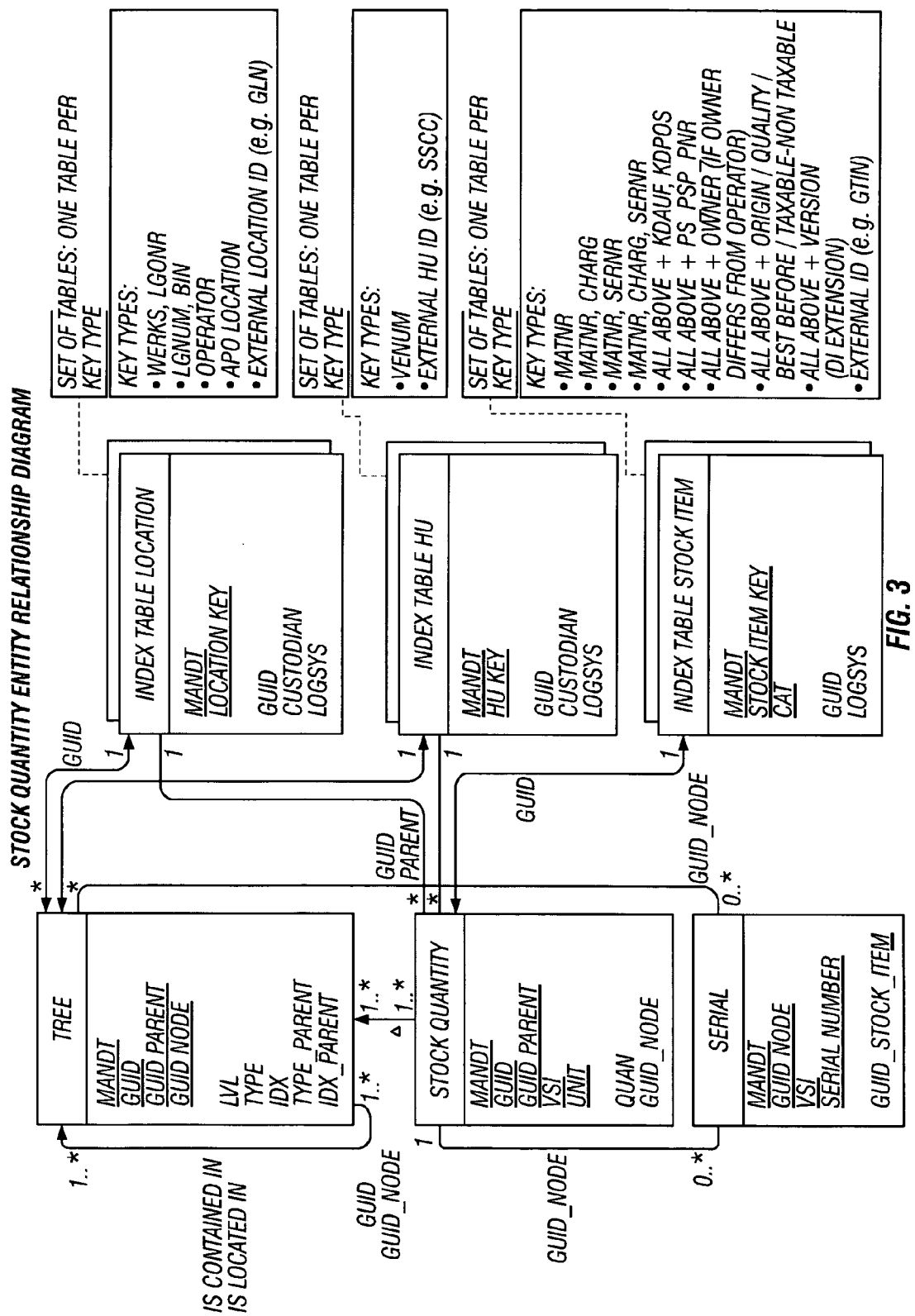
FIG. 3 is a stock quantity entity relationship diagram showing the relationship between the tables used in one inventory management engine.

The database model and index tables described above are also shown in FIG. 3 in the form of a conventional entity relationship diagram for stock quantities.

Creating and Deleting Entries in the Inventory Management Engine

To add new locations, handling units, or stock items, entries need to be created in the corresponding index table and in the hierarchy tree. In one implementation, stock items can be created "on the fly" with a goods movement, while handling units need to be created through calling a particular maintenance module. When creating a location, a handling unit, or a stock item the LIME ensures that the hierarchy rules described above are not violated. In one implementation this means that a parent node always needs to be specified for locations or handling units. For locations (but not for handling units or stock items), the parent node can be the ROOT node. Whenever entries in the index tables are updated, the LIME updates the tree table /LIME/TREE and performs the necessary checks.

Entries in the stock index tables can be created without specifying a parent node. The new stock table entries are integrated into the table representing the hierarchy tree when a goods movement process occurs. The integration takes place by calling a BADI that enables the caller to decide if the stock should be created, or if the goods movement should be canceled with an error. Materials with batches or goods movements with new stock categories are examples of were it could be suitable to create stock entries "on the fly."

Figure 5:
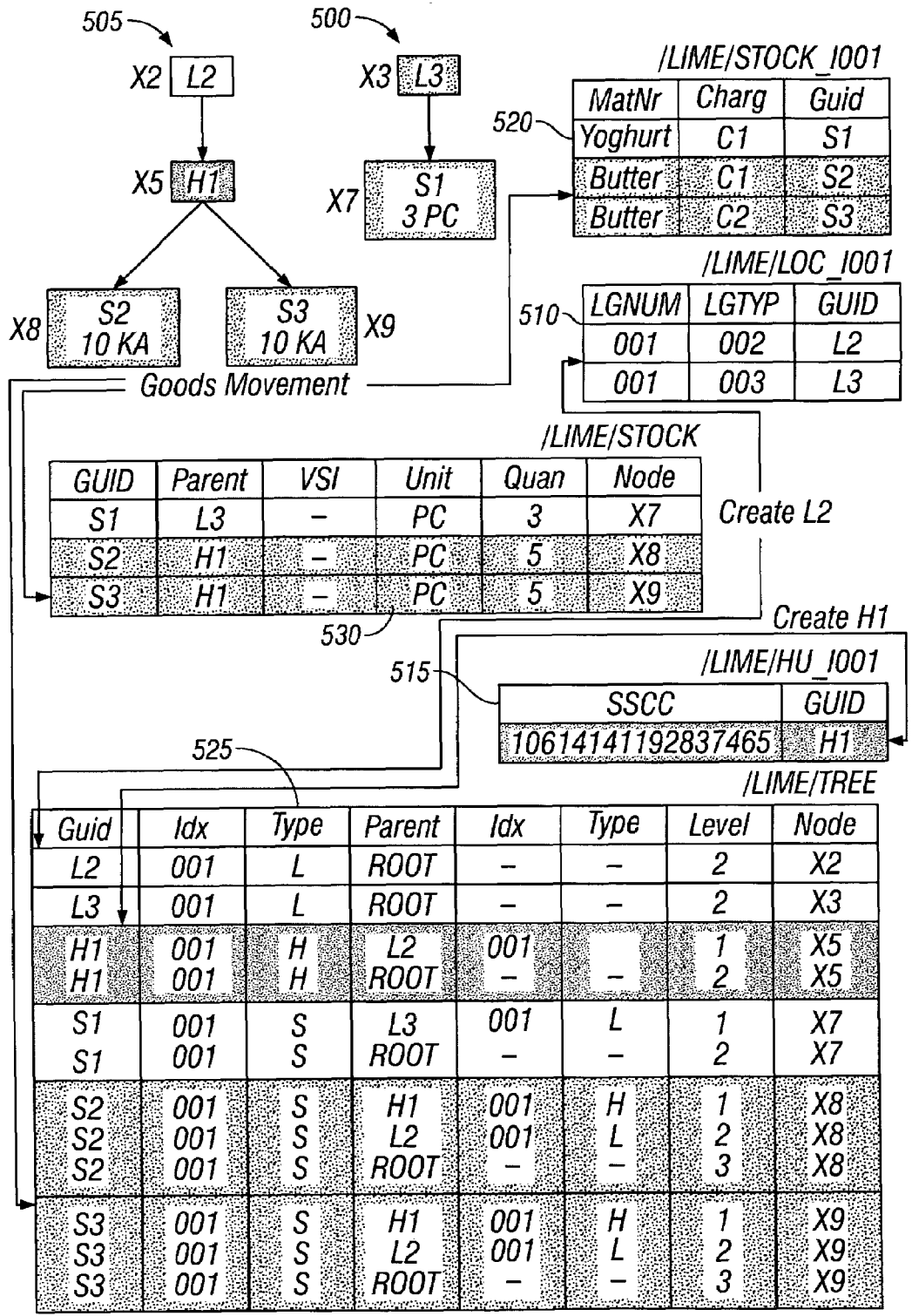
FIG. 5 is a schematic diagram showing how to add new entries into the table structure in one inventory management engine.

FIG. 5 shows how the index tables and their entries are changed when creating the location L2 and the handling unit H1. In addition to creating the location L2 and the handling unit H1, two batches of the material 'Butter' are also created in a goods movement operation. Originally, only the rightmost hierarchy tree (500) exists and the corresponding entries in tables 510, 520, 525 and 530, that is, entries with guids L3 and S1. When a user wishes to create a new location, the location index table (510) is updated with the new location information and a new guid L2 is assigned. The hierarchy tree table (525) is also updated with a new entry that corresponds to L2 and only has ROOT as a parent, and a new node guid X2 is assigned to the new location L2.

Next, a handling unit is created in location L2 by creating an entry in a handling unit index table (515) and updating the hierarchy tree table (525) with the corresponding handling unit entry, as well as adding a new node guid X5 to the handling unit. Finally a set of two stock items "Butter" are added to the handling unit by updating the stock index table (520) with two new entries. The new guids S2 and S3 are generated for the two new "Butter" items, and the corresponding entries are created in the stock item table (530) and in the hierarchy tree (525) table. The resulting hierarchy tree (505) is shown in the left hand side of FIG. 5. How the actual writing to the various tables is carried out will be discussed in further detail below.

In this exemplary implementation of the invention, it is only possible to delete locations or handling units if the locations or handling units are on a leaf level of the hierarchy tree, that is, if the location or handling unit does not have any children. Entries from the stock index tables can be deleted only if the corresponding entries to be deleted from the table /LIME/STOCK has a quantity of zero.

Writing and Reading Data in the Inventory Management Engine

The data table model used in LIME has been designed to allow fast queries for complex supply chain networks and fast writing of data when stock movement documents are posted. Entries of the table /LIME/STOCK can be identified using either the guid and parent guid combination, or using the node guid. For goods movements, the guid and parent guid combination is used to avoid an additional select operation on the /LIME/TREE table. Queries use the node guid when the stock item, but not the direct parent, is specified.

Movements of products for owners and total stock levels result in updates of only one table (the /LIME/STOCK table). As long as the hierarchy is not changed, table /LIME/TREE does not change and does not need to be updated. Movement of the handling unit to a different location, on the other hand, results in a change in table /LIME/TREE but table /LIME/STOCK remains unchanged. Similarly, a stock change can be posted to the handling unit, which in return leads to an update of the relevant entry in table /LIME/STOCK only.

Figure 6:
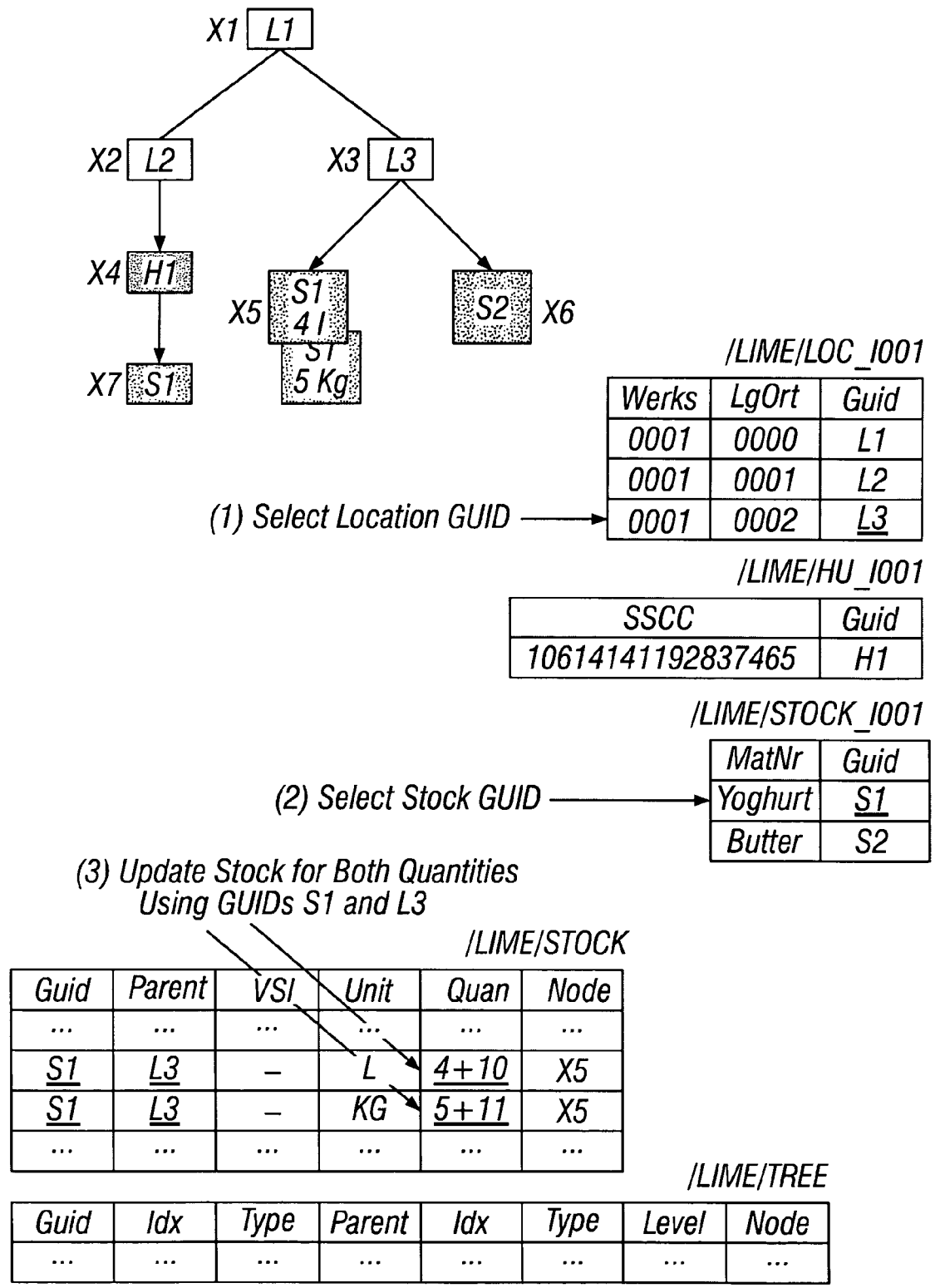
FIG. 6 is a schematic diagram showing a goods movement in the table structure in one inventory management engine.

FIG. 6 shows how a goods movement is reflected in LIME. In the example it is assumed that stock S1 (yogurt), in location L3 (warehouse number 0001 and storage location 0002) is increased by 10 liters and 11 kilograms, respectively (in the scenario, it is assumed that yogurt is measured both in the units liters and kilograms). First, the location guid (L3) is selected in the location index table /LIME/LOC_I001. Second the stock guid (S1) for yogurt is selected in the stock index table /LIME/STOCK_I001. Finally the stock corresponding to guids S1 and L3 is updated in the stock table /LIME/STOCK.

With the hierarchy tree table concept, most queries can be carried out using a single select statement (joined with the relevant index table) on the table /LIME/TREE. A distinction can be made between two general types of queries: top-down queries, where the basic query is "Show me what I contain," and bottom-up queries, where the basic query is "Show me where I am in the world." Depending on the business scenario and setup of the supply chain, optimized queries can be developed using this basic conceptual approach.

Figure 7:
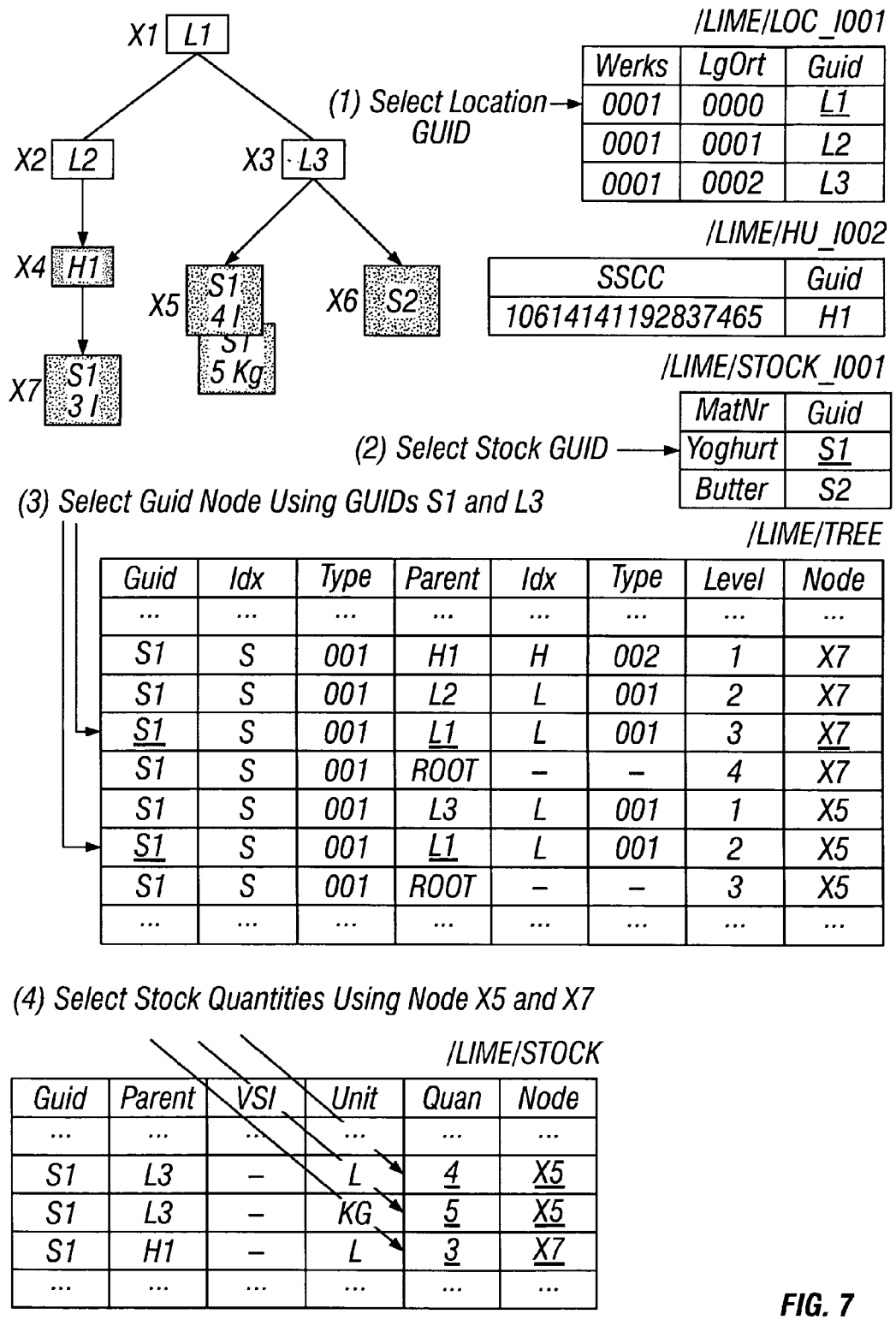
FIG. 7 is a schematic diagram showing how to select a particular entry in the table structure in one inventory management engine.

FIG. 7 shows how LIME selects the stock of S1 in location L1. First, the location guid (L1) is selected in the location index table /LIME/LOC_I001. Second the stock guid (S1) for yogurt is selected in the stock index table/ LIME/STOCK_I001. Third, the nodes in the hierarchy table /LIME/TREE are identified using the guids S1 and L1. Since the table /LIME/TREE holds all parents of a stock item, it is possible to find all occurrences of a stock item with only one select operation on the table /LIME/TREE. It is not necessary to do one select operation for each level against the tree table. From the hierarchy table /LIME/TREE, it can be seen that the nodes are X5 and X7. Finally, the stock quantities corresponding to nodes X5 and X7 are retrieved from the "Quantities" column in the stock table /LIME/STOCK.

Functional Overview

Figure 4:
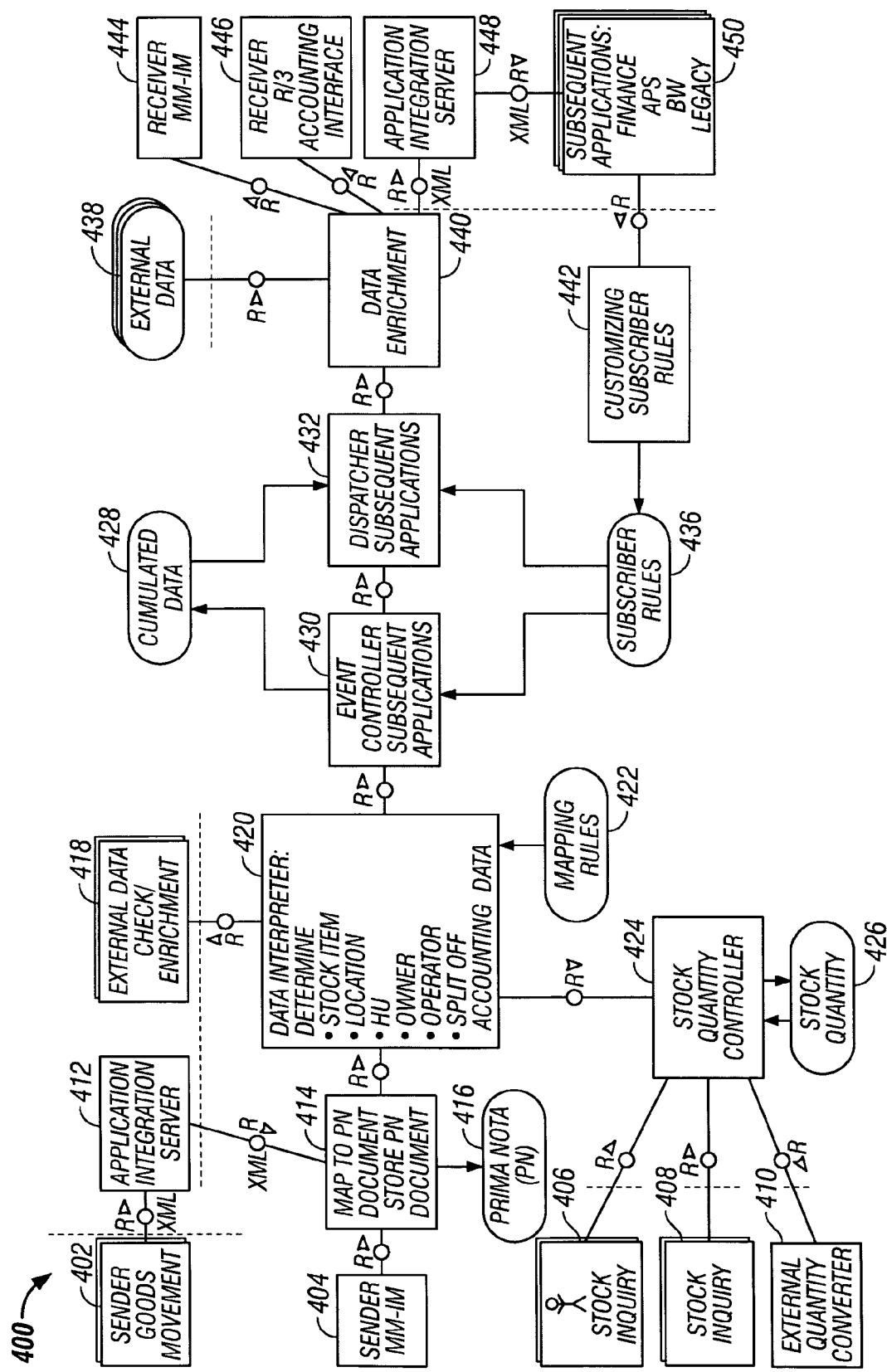
FIG. 4 is a flowchart showing a process in an inventory management system.

A more detailed process for inventory management in accordance with one implementation of the invention will now be described with reference to the schematic block diagram (400) in FIG. 4. In FIG. 4, all the blocks outside the dashed lines (that is, blocks 402-412, 418, 438, and 444-450) represent external components, while all the blocks inside the dashed lines (that is, blocks 414-416, 420-436, and 440-442) represent the inventory management engine.

LIME receives a message from a calling application (402, 404) containing stock movement data or physical inventory data. The message can be an XML document that is forwarded to LIME via an Application Integration Server (412) or it can be a function module call from a mySAP application (404). The incoming document is kept by LIME during the whole process.

LIME then generates (414) an update log (prima nota) (416) if necessary. The prima nota holds all input data that is required for recovery in the event of a system failure or auditing. After generating the prima nota (416), LIME extracts (420) its own data from the incoming document, such as location, handling unit, stock quantities, and so on and maps it to the LIME internal structures described above according to a set of mapping rules (422). An external data check or data enrichment (418) is also carried out, if necessary, and a stock quantity controller (424) updates a stock quantity database (426).

External applications (406-410) can submit stock inquiries to LIME through the stock quantity controller (424). Each application that is interested in stock movement or physical inventory documents subscribes to LIME, and defines the dispatching rules for the documents. Users of the LIME application can include rules based on various conditions, such as which criteria are relevant for the subscribing application (for example, finance applications need to be informed of changes in stock ownership), how often the subscribing application will receive documents from LIME (for example, once per day), and whether the documents will be cumulated by LIME before dispatching and what the aggregation rules are.

An event controller (430) then checks the subscriber rules (436) for the various applications and forwards the document (maybe in cumulated form) to the interested applications using a dispatcher (432). The forwarding may include adding cumulated data (428) and obtaining other external data (438) for enrichment (440) with the LIME data before the LIME data is passed on to the receiving applications. The receiving applications may include an MM-IM system (444), a R/3 accounting interface (446), and an Application integration server (448). The application integration server (448) may call various subsequent applications (450), such as finance applications, legacy applications, and so on. These applications can in turn customize (442) the subscriber rules (436) used by the event controller to dynamically change the behavior of the event controller (430) and dispatcher (432) before the next event takes place.

A number of embodiments of the invention have been described. Nevertheless, it will be understood that various modifications may be made without departing from the spirit and scope of the invention. For example, the stock quantity data in the database 16 can be distributed among one or more databases. Accordingly, other embodiments are within the scope of the following claims.

What is claimed is:

1. A computer-implemented method for managing data items in an inventory management system, comprising:

receiving a request to add a data item to the inventory management system, the data item having an associated set of attributes to be represented in the inventory management system;

determining whether the inventory management system includes an index table in which the data item and the set of attributes can be represented;

if no index table exists in which the data item und the set of attributes can be represented, automatically defining a new index table in which the data item and the set of attributes can be represented, the new index table being defined independently of existing index tables;

adding a data item identifier and the set of attributes associated with the data item to the defined new index table; and adding a new data item node to a hierarchy that represents relations among data item nodes, the new data item node including the data item identifier, the hierarchy being separate from the existing index tables and the new index table, wherein the new data item node is added into the hierarchy according to rules that define valid relations in the hierarchy, the valid relations being defined in view of (1) a level in the hierarchy to which the new data item node is to be added, and (2) whether each of the new data item node and a corresponding ancestor node in the hierarchy is a stock unit, a handling unit of stock quantities, or a location of the stock unit.

2. The method of claim 1, wherein the data item represents: the stock item, the handling unit of stock quantities, or the location of the stock unit.

3. The method of claim 1, further comprising:

automatically defining a unique node identifier to represent the new data item node in the hierarchy, the new data item node being associated with the data item and the set of attributes;

determining a location within the hierarchy for the new data item node, based on one or more of the attributes in the set of attributes; and adding the unique node identifier to the hierarchy at the determined location.

4. The method of claim 3, wherein the determining and adding steps are performed in accordance with a set of rules associated with the hierarchy.

5. The method of claim 1, wherein receiving a request to add a data item comprises receiving an XML document defining the data item and the associated set of attributes.

6. The method of claim 1, further comprising updating one or more external system in response to the adding of the data item and the set of attributes associated with the data item to the defined new index table.

7. The method of claim 1, wherein each index table further includes a global unique identifier field to store the data item identifier and one or more attribute fields, each attribute field representing an attribute associated with the data item.

8. The method of claim 7, further comprising updating a tree hierarchy table every time a unique node identifier is created.

9. The method of claim 1, wherein the index table is: a stock index table, a location index table, or a handling unit index table.

10. A computer program product stored on a machine-readable storage medium comprising instructions operable to cause a programmable processor to:

receive a request to add a data iten 1 to the inventory management system, the data item having an associated set of attributes to be represented in the inventory management system;

determine whether the inventory management system includes an index table in which the data item and the set of attributes can be represented;

if no index table exists in which the data item and the set of attributes can be represented, automatically define a new index table in which the data item and the set of attributes can be represented, the new index table being defined independently of existing index tables;

add a data item identifier and the set of attributes associated with the data item to the defined new index table; and add a new data item node to a hierarchy that represents relations among data item nodes, the new data item node including the data item identifier, the hierarchy being separate from the existing index tables and the new index table, wherein the new data item node is added into the hierarchy according to rules that define valid relations in the hierarchy, the valid relations being defined in view of a level in the hierarchy to which the new data item node is to be added and whether each of the new data item node and a corresponding ancestor node in the hierarchy is a stock unit, a handling unit of stock quantities, or a location of the stock unit.

11. The computer program product of claim 10, wherein the data item represents: the stock item, the handling unit of stock quantities, or the location of the stock unit.

12. The computer program product of claim 10, further comprising instructions to:

automatically define a unique node identifier to represent the new data item node in the hierarchy, the new data item node being associated with the data item and the set of attributes;

determine a location within the hierarchy for the new data item node, based on one or more of the attributes in the set of attributes; and add the unique node identifier to the hierarchy at the determined location.

13. The computer program product of claim 12, wherein the determining and adding steps are performed in accordance with a set of rules associated with the hierarchy.

14. The computer program product of claim 10, wherein receiving a request to add a data item comprises receiving an XML document defining the data item and the associated set of attributes.

15. The computer program product of claim 10, further comprising instructions to update one or more external system in response to the adding of the data item and the set of attributes associated with the data item to the defined new index table.

16. The computer program product of claim 10, wherein each index table further includes a global unique identifier field to store the data item identifier and one or more attribute fields, each attribute field representing an attribute associated with the data item.

17. The computer program product of claim 16, further comprising instructions to update a tree hierarchy table every time a unique node identifier is created.

18. The computer program product of claim 10, wherein the index table is: a stock index table, a location index table, or a handling unit index table.

* * * * *

UNITED STATES PATENT AND TRADEMARK OFFICE
CERTIFICATE OF CORRECTION

| | |
|---|---|
| PATENT NO. | : 7,383,284 B2 |
| APPLICATION NO. | : 10/159599 |
| DATED | : June 3, 2008 |
| INVENTOR(S) | : Matthias Heinrichs et al. |

It is certified that error appears in the above-identified patent and that said Letters Patent is hereby corrected as shown below:

In Column 13, line 49, please delete "iten" and insert -- item --.

In Column 13, line 49, please delete "1".

Signed and Sealed this

Eleventh Day of August, 2009

David J. Kappos
*Director of the United States Patent and Trademark Office*